Jan. 16, 1968  HARUMITSU NAKAMURA ET AL  3,363,732
FORWARD AND REVERSE TRANSMISSION WITH BRAKE FOR PRIME MOVER
Filed Aug. 9, 1965

INVENTORS
HARUMITSU NAKAMURA
TOSHITAKE TEJIMA
HOICHI SOMEYA
Nolte & Nolte
ATTORNEYS

United States Patent Office 3,363,732
Patented Jan. 16, 1968

3,363,732
FORWARD AND REVERSE TRANSMISSION WITH BRAKE FOR PRIME MOVER
Harumitsu Nakamura, Toshitake Tejima, and Hoichi Someya, Tokyo-to, Japan, assignors to Ishikawajima-Harima Jukogyo Kabushiki Kaisha, Tokyo-to, Japan, a company of Japan
Filed Aug. 9, 1965, Ser. No. 478,174
Claims priority, application Japan, Aug. 22, 1964, 39/47,750
4 Claims. (Cl. 192—4)

ABSTRACT OF THE DISCLOSURE

A device for propelling a ship or for driving any large load which has a large inertia and which must be driven in opposed directions. The device includes a unidirectional prime mover such as a turbine which provides a given driving force in a given direction. A forward transmission is connected between the prime mover and an output shaft which is connected to the load, so as to deliver the power in a forward direction to the load for driving the latter forwardly, as in the case of propelling a ship in which case the output shaft would be connected to the propeller of the ship. A rearward transmission is connected between the forward transmission and the output shaft for reversing the direction in which the latter is driven while still taking the drive in the same direction from the unidirectional prime mover. A pair of positive, toothed clutches are respectively located in and form part of the forward and rearward transmissions, each of these clutches including a driving clutch member and a driven clutch member. A pair of brakes are operatively connected with both of the transmissions, respectively, for braking only the prime mover when the direction in which the output shaft is driven is to be reversed. The output shaft itself is not braked. The clutches are alternately engaged so that at any given time the output shaft is driven either in a forward direction or in a reverse direction. Assuming that the output shaft is driven in the forward direction and that it is desired to reverse the drive, so as to drive the output shaft in the reverse direction, then the clutch of the forward transmission is disengaged while the clutch of the rearward transmission is maintained in its disengaged condition, and the brakes are applied so as to reduce the speed of operation of the prime mover, and upon slowing down of the latter the clutch of the rearward transmission is engaged so that while the output shaft continues to turn in the forward direction due to inertia it is connected through the clutch of the rearward transmission to the prime mover. Thus, while the latter seeks to provide the unidirectional drive, it is nevertheless driven in the opposite direction by the force of inertia from the output shaft until the latter reverses its direction at which time the drive is taken from the prime mover.

This invention relates to a device for astern propulsion which is adapted for a ship using as its prime mover a high-speed one-way rotating turbine such as a gas turbine (two-shaft free turbine or the like, the output shaft of which is not connected mechanically with the compressor shaft) and a steam turbine, and which can be mounted with much ease and little expense, and is relatively safe from a possible disorder, characterized in that, toothed clutches equipped with synchronization means are adapted to each of the two intermediate shafts (one for forward and the other for backward) which are turned in opposite directions to each other by the shaft of a prime mover so as to connect and disconnect the shaft of the prime mover with the shaft of the propeller at one end of the corresponding intermediate shaft, and powerful friction brakes are attached to the input side of the clutches and that it is constructed in a manner that after disconnection of the clutch for forward movement, the input side together with the turbine shaft is stopped by means of the said powerful friction brake attached to the input side of the clutch and then, due to the insertion of the clutch for backward movement by means of said toothed clutches equipped with synchronization means, the relation of the directions of rotation of turbine shaft and the propeller shaft is changed.

Also comprised is a device contrived to give reverse torque to the turbine by putting the ejection angle of the nozzle in the reverse direction in an appropriate manner instead of operating said friction brake against the input shaft, or in cooperation and simultaneously with this friction brake, the ejection angle of the nozzle of turbine being made variable for the purpose of reducing the speed of said turbine shaft.

The device for astern propulsion under this invention is used for transmitting great output, and is therefore characterized in that a toothed clutch, but neither a friction clutch nor vulcan gear is used for transmitting the torque of the prime mover to the propeller. If these friction clutches or vulcan gears were used, the device in question would become too large to be put into realization.

Embodiments of this invention will be explained in reference to drawings.

Figure 1:
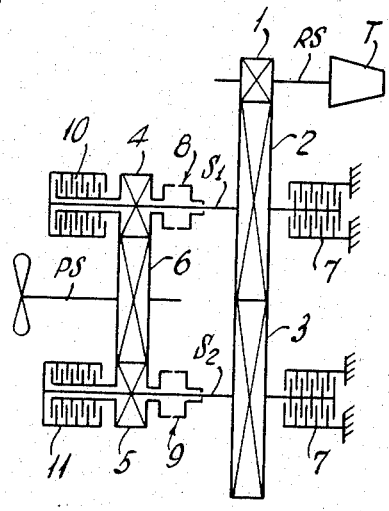

FIGURE 1 is a diagram which illustrates the structure of device for astern propulsion under this invention.

Figure 2:
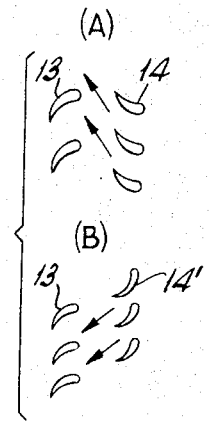

A and B of FIGURE 2 are diagrams which illustrate the condition of turbine nozzles which are made reversible.

Figure 3:
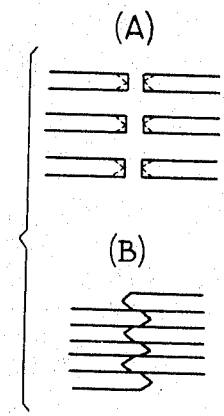

A and B of FIGURE 3 are diagrams which illustrate how toothed clutches are inserted.

FIGURE 1 shows an embodiment so constructed that one prime mover may transmit motive power to one propeller, wherein 1 is a first small gear or pinion attached to rotor shaft RS of the prime mover turbine T, 2 is the first large gear for forward movement, 3 is the first large gear for rearward movement to be driven by means of teeth meshing with said large gear 2, 4 is the second small gear or pinion for forward movement mounted on the shaft $S_1$ of the first large gear for forward movement in a freely rotatable manner, 5 is the second small gear or pinion for rearward movement mounted on the shaft $S_2$ of the first large gear for rearward movement in a freely rotatable manner, 6 shows the second large gear attached to the propeller shaft PS and driven by means of teeth meshing with small pinions 4 and 5, 7 is a friction brake, 8 is a toothed clutch for forward movement, 9 is a toothed clutch for rearward movement, and 10 and 11 are synchronization devices of toothed clutches for forward movement and rearward movement respectively for an embodiment equipped with a friction clutch similar to a friction brake. It is to be noted here that this friction clutch is merely used for synchronization in order to match the toothed clutch (e.g., a spline type) and therefore if an attempt is made to synchronize the input side (the turbine side) with the output side (propeller) which is rotated by big force of the water stream, this friction clutch gives rise to friction between them so that there may not be relative speed between the two shaft systems. It is also to be noted that this friction clutch by itself does not transmit the output of the prime mover to the propelling side.

While the ship is moving forward, the turbine T is operated with the clutch 8 for forward movement engaged and the clutch 9 for rearward movement and brake 7 released.

Thus the motive power generated by the operation of turbine T is transmitted to propeller shaft PS by means of gear 1 and 2, clutch 8, and gear 4 and 6, causing the ship to move forward.

When the forward moving ship is to go astern, the thing to do is to reduce the output of turbine T or reduce the generated torque so that the turbine side may not over run when the clutch 8 for forward movement is disconnected, and then release the ahead clutch 8. In this way turbine T and the shaft of propeller PS are isolated, and then the two brakes 7 are operated to absorb the rotating energy of the rotor of turbine T to stop. When the brake is let loose after the rotor shaft RS has slowed down or stopped, the synchronization device 11 of the astern clutch 9 is operated and this is placed in the inserted position when the toothed clutch 9 for rearward movement has synchronized, and thus the rotation of turbine rotor and propeller shaft relative to each other is reversed. Since the propeller is turned by the big force of running water because of the forward movement of the ship under this operation, the propeller side keeps rotation in the same direction as in the case of forward movement, and consequently the turbine rotor is forcibly turned reversely. In this condition, if the output of turbine is increased and brings forth torque to rotate positive, the rotation of turbine rotor changes from reverse to positive, whereby the propeller is rotated in the direction opposite to that of forward movement and the ship is slowed down in the forward movement and begins to move backward in time.

In order to change the movement of the ship from backward to forward, only operation reverse to the above mentioned is needed.

FIGURE 2 shows a case in which the turbine nozzle is made reversible. In the case of A, the turbine is in the normal output condition, but when an attempt is made to stop the turbine rotor quicker, nozzle 14 is deviated to position 14′ in B and the jet of gas works in such a way as to brake movable blade 13 by decreasing positive torque or generating reverse torque. Therefore, this can be used as a substitute for the above-mentioned two brakes or be used in cooperation with them so as to double the efficiency.

In this way the usage of variable nozzle can slow down the r.p.m. much more quickly than the method of adjusting the quantity of fuel burning or regulating the steam inlet.

The above explanation has been made with the friction clutch for a synchronization device, but in this instance, it may happen that teeth of a toothed clutch push each other as illustrated in FIGURE 3A, in such a manner that it cannot be inserted. In that case, it is necessary to sharpen the teeth end like the prow of a ship in an easily slidable manner as is shown in FIGURE 3B and to loosen somewhat the friction clutch with the progress of the clutching movement so as to enable each tooth to slide into a proper position. This could be done more easily, if we put some relation between the progress of the clutch movement and the regulating device of friction power of friction clutch, regardless of whether the clutching movement is made by liquid pressure or by any other means. As synchronization device, electric friction or liquid friction (e.g., vulcan gear or brake of eddy current) could be used, but in this case, as the appearance of relative speed is inevitable, due consideration is needed to lessen the impingement shock at the time of insertion of toothed clutch. It is optional to attach those synchronization devices and brakes at prow end and stern end of the gear device so as to facilitate its dismantling and adjustment as is shown in FIGURE 1.

As the astern device of this invention has two friction brakes and two friction clutches for one prime mover shaft, and is so contrived as to change from forward to backward movement or from backward to forward movement through the medium of reduction gear device by those separately mounted brakes and clutches, we can minimize the energy which should be absorbed by one clutch or brake by dividing the total energy which arises from changing the direction of rotation of turbine side whole system after separating from propeller system by clutch.

In case of very big power system, we can put one more intermediate shaft for forward movement parallel with the existing one composing so-called locked train system and then we put another brake on this intermediate shaft also which can share the energy dissipation as well.

It is also possible to reduce the relative speed between both ends of clutch by attaching a friction brake not only to the input side of clutch but also to the output side thereof in order to expedite the synchronization for the engaging of clutch during backward (forward) movement after releasing the clutch during forward (backward) movement. But in the case of a large ship the water force caused by the inertial movement of the ship has a very high torque that turns the propeller. Therefore, according to this invention, instead of braking such a large torque of a propeller shaft after disconnecting the dog clutch between turbine and propeller, we brake turbine shaft, whose speed is much easier to reduce, and then put the dog clutch of reversing gear in after synchronization.

By so doing, the turbine will be rotated reversely for a time due to the big torque of water from the propeller. However, after throttling the driving turbine, powerfully operating fluid acts on the turbine, which accordingly changes the direction of rotation of turbine from reverse to positive, and consequently the direction of rotation of propeller from positive to reverse withstanding the positive torque of the water force.

This invention can be used not only for the change-over of the direction of movement of large ship, but also for the machinery of large capacity and inertia that is driven by the high speed one-way rotation turbine such as an iron manufacturing rolling mill. As contrasted from the conventional operations used with steam turbines in which the turbine for rearward movement is attached separately or integrally with the main turbine, as the main turbine can be used for rearward movement with this invention, there is a decrease in the cost of the equipment by a great deal, and it is possible to remove the loss of output caused by idle rotation of the turbine for rearward movement during the forward movement, and especially it is possible to generate motive power of the same capacity during forward movement as in forward movement.

Thus, in accordance with the invention the device for driving a load of large inertia in opposed directions includes the unidirectional prime mover means T for providing a unidirectional drive at its shaft RS. The load is driven by the output shaft PS and a forward transmission means, which includes the transmission members 2 and 4, is operatively connected with the prime mover means T and the output shaft PS for driving the latter in a forward direction, while a rearward transmission means, which includes the transmission elements 3 and 5, is operatively connected with the forward transmission means and the output shaft for reversing the direction in which the latter is driven while the unidirectional prime mover means continues to provide the drive in the same direction at its shaft RS.

A forward positive, toothed clutch means 8 is located in and forms part of the forward transmission means, while a rearward positive, toothed clutch means 9 is located in and forms part of the rearward transmission means. The forward clutch means 8 is engaged while the rearward clutch means 9 is disengaged, for rendering the forward transmission means operative to drive the output shaft PS forwardly, while the rearward clutch means 9 is engaged with the forward clutch means 8 disengaged in order to render the rearward transmission means operative to drive the output shaft PS rearwardly.

At least one brake means 7 is operatively connected with the forward transmission means at a first part thereof extending between the prime mover and clutch means 8, although in the illustrated example a pair of brake means 7 are shown respectively connected with the forward transmission means and the rearward transmission means at a first part of the latter situated between the prime mover and clutch 9, and in accordance with the invention the entire brake means 7 of the entire apparatus is operatively connected to the transmission means only between the clutch means and the prime mover means, so that the output shaft which drives the load is itself never braked, and only the unidirectional prime mover means is braked.

When it is desired to reverse the direction in which the output shaft is driven, so that the drive will be changed over from one of the transmission means to the other of the transmission means, the clutch means of the operating transmission means is disengaged while the other clutch means is maintained in its disengaged position, and the brake means are applied so as to retard the operation of the prime mover means, and then the clutch means of the other transmission means is engaged so as to connect the output shaft through this other transmission means to the prime mover which may for a time be driven reversely from the output shaft itself until the direction in which the latter is driven changes. In this way it becomes possible to reverse the direction in which the load is driven by utilizing the prime mover itself for retarding the output shaft while the latter is not braked in any way, and when dealing with relatively large loads such as ship propulsion, it is much easier to apply the braking force to the prime mover than to the output shaft which is directly connected to the load. In order to facilitate the engagement of the clutch means, synchronizing means 10 and 11, which may take the form of simple friction clutches, are operatively connected only with the driven components of the pair of clutch means 8 and 9, respectively, so as to bring about synchronism between the driving and driven components of each clutch means preparatory to engaging them, and it is to be noted that these friction clutches 10 and 11 in no way participate in the transmission of the drive and do not in any way retard the output shaft PS.

In order to further retard the prime mover during reversal, when this prime mover takes the form of a turbine, it is possible to reverse the blades 14 to the position 14' shown in FIG. 2, as indicated above.

What we claim is:

1. Apparatus for driving, in opposed directions, a load which has a large inertia, comprising unidirectional prime mover means for providing a drive in one direction only, an output shaft operatively connected to the load, forward transmission means operatively connected between said output shaft and said prime mover means for driving said output shaft in a forward direction with energy transmitted from said prime mover means, rearward transmission means operatively connected between said forward transmission means and said output shaft for driving the latter in a rearward direction with energy from said prime mover means, a forward, positive, toothed clutch means located in and forming part of said forward transmission means and including a driving member driven through a first part of said forward transmission means from said prime mover means and a driven member driven by said driving member of said forward clutch means and transmitting the drive therefrom through a second part of said forward transmission means to said output shaft, rearward positive, toothed, clutch means located in and forming part of said rearward transmission means and including a driving member driven by said prime mover means through a first part of said rearward transmission means and a driven member for transmitting the drive to said output shaft through a second part of said rearward transmission means, said forward clutch means having an engaged position when said rearward clutch means is in a disengaged position and a disengaged position when said rearward clutch means is an engaged position and brake means forming the entire brake structure of the apparatus and operatively connected only with said prime mover means for braking the latter, so that no braking force is applied to said output shaft, said brake means including at least one brake operatively connected to said first part of said forward transmission means, whereby in order to change from forward to reverse driving of said output shaft said forward clutch means is disengaged, while said rearward clutch means remains disengaged, said brake means is applied to retard the operation of said prime mover means and is then released, and said rearward clutch means is then engaged to connect said output shaft to said prime mover means for driving the latter with any residual inertia forces of the load until the driving direction of said output shaft is reversed so that the latter will then be driven in the reverse direction by said prime mover means, the engagement and disengagement of said forward and rearward clutch means being reversed when changing from rearward driving to forward driving of said output shaft, said brake means including a pair of brakes respectively connected operatively with both of said first parts of said forward and rearward transmission means.

2. The combination of claim 1 and wherein a pair of synchronizing means are operatively connected with said driven members of said forward and rearward clutch means for synchronizing said driven members with said driving members thereof, respectively, preparatory to engagement of one of the other of said clutch means.

3. The combination of claim 2 and wherein said pair of synchronizing means are each in the form of a friction clutch.

4. The combination of claim 1 and wherein said prime mover means is a turbine having a reversible turbine nozzle for further retarding the operation of said prime mover means preparatory to changing over from one driving direction to another driving direction of said output shaft.

References Cited

UNITED STATES PATENTS

| | | | |
|---|---|---|---|
| 2,086,723 | 7/1937 | Maybach | 192—.094 |
| 2,104,608 | 1/1938 | Cox et al. | 192—.09 X |
| 2,961,078 | 11/1960 | Shannon et al. | 192—.09 X |
| 3,003,606 | 10/1961 | Hindmarch | 192—4 |
| 3,197,000 | 7/1965 | Conkle | 192—53.6 |

BENJAMIN W. WYCHE III, *Primary Examiner.*